April 25, 1950 W. M. GOODALL 2,505,040
REGENERATIVE RELAY REPEATER
Filed June 4, 1948 3 Sheets-Sheet 1
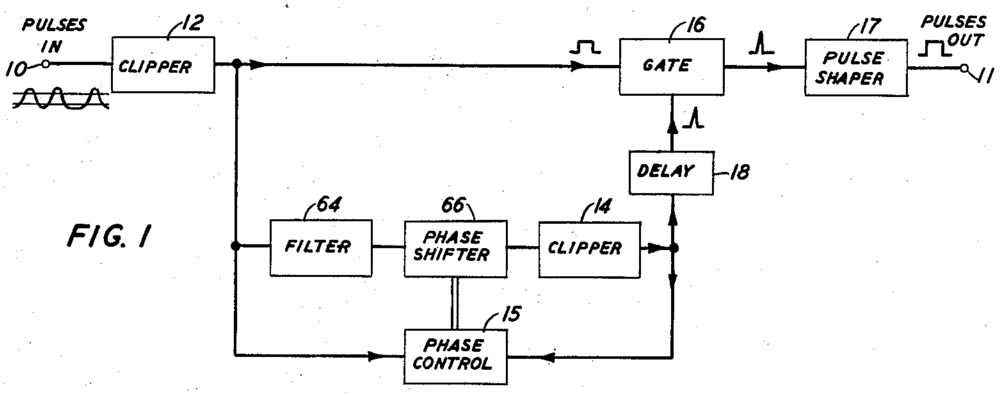
FIG. 2
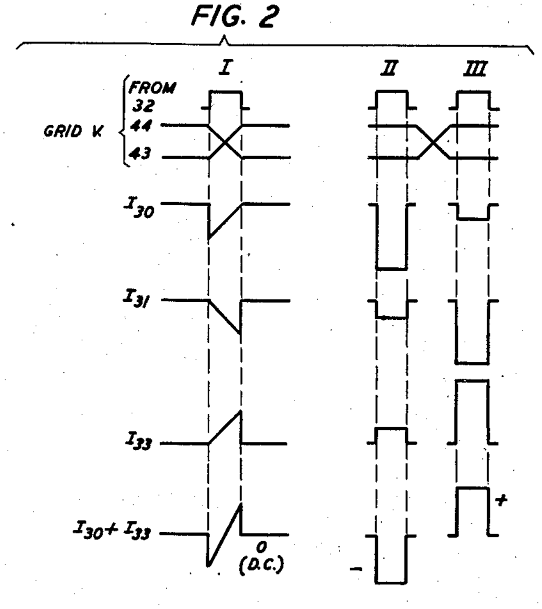
FIG. 6
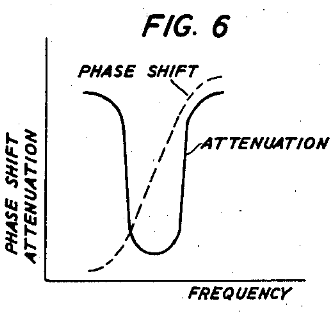
FIG. 3
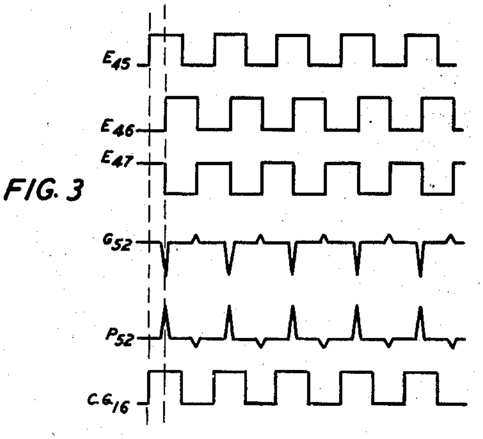
INVENTOR
W. M. GOODALL
BY H. A. Burgess
ATTORNEY INVENTOR
W. M. GOODALL
BY H. A. Burgess
ATTORNEY April 25, 1950 W. M. GOODALL 2,505,040

REGENERATIVE RELAY REPEATER

Filed June 4, 1948 3 Sheets-Sheet 3

INVENTOR
W. M. GOODALL
BY H. A. Burgess
ATTORNEY

Patented Apr. 25, 1950

2,505,040

UNITED STATES PATENT OFFICE 2,505,040

REGENERATIVE RELAY REPEATER

William M. Goodall, Oakhurst, N. J., assignor to Bell Telephone Laboratories, Incorporated, New York, N. Y., a corporation of New York Application June 4, 1948, Serial No. 31,135

5 Claims. (Cl. 178—70)

The present invention relates to a regenerative repeater for pulse transmission systems. A regenerative repeater is one which produces and sends out new pulses under control of received pulses.

Heretofore it has been proposed to produce the new pulses at the repeater by means of a generator running independently of the received pulses and supposedly producing pulses at the nominal or average rate of the pulses transmitted over the system. These locally produced pulses are either sent out or are suppressed depending upon whether or not there is a currently received pulse to be repeated. In such a system, variations in timing between the locally supplied pulses and the received pulses, if the variations are large enough, may give rise to erratic operation at the repeater or introduce errors in the message as finally received, especially in the case of a system having several repeaters since the effect of the variations is cumulative.

An object of this invention is to derive local pulses at the repeater from or under control of received pulses so as to maintain the locally supplied pulses at the repeater in correct time and phase.

A subsidiary object is to compensate the phase shift produced in the derived pulses by the selecting filter due to small shifts in frequency of the received pulses.

The nature and objects of the invention will appear more fully from the following detailed description of an illustrative embodiment shown in the attached drawings in which:

Fig. 1 is a block schematic diagram of a repeater station according to the invention;

Figs. 2 and 3 show graphs of wave forms to be referred to in connection with the description;

Figure 4:
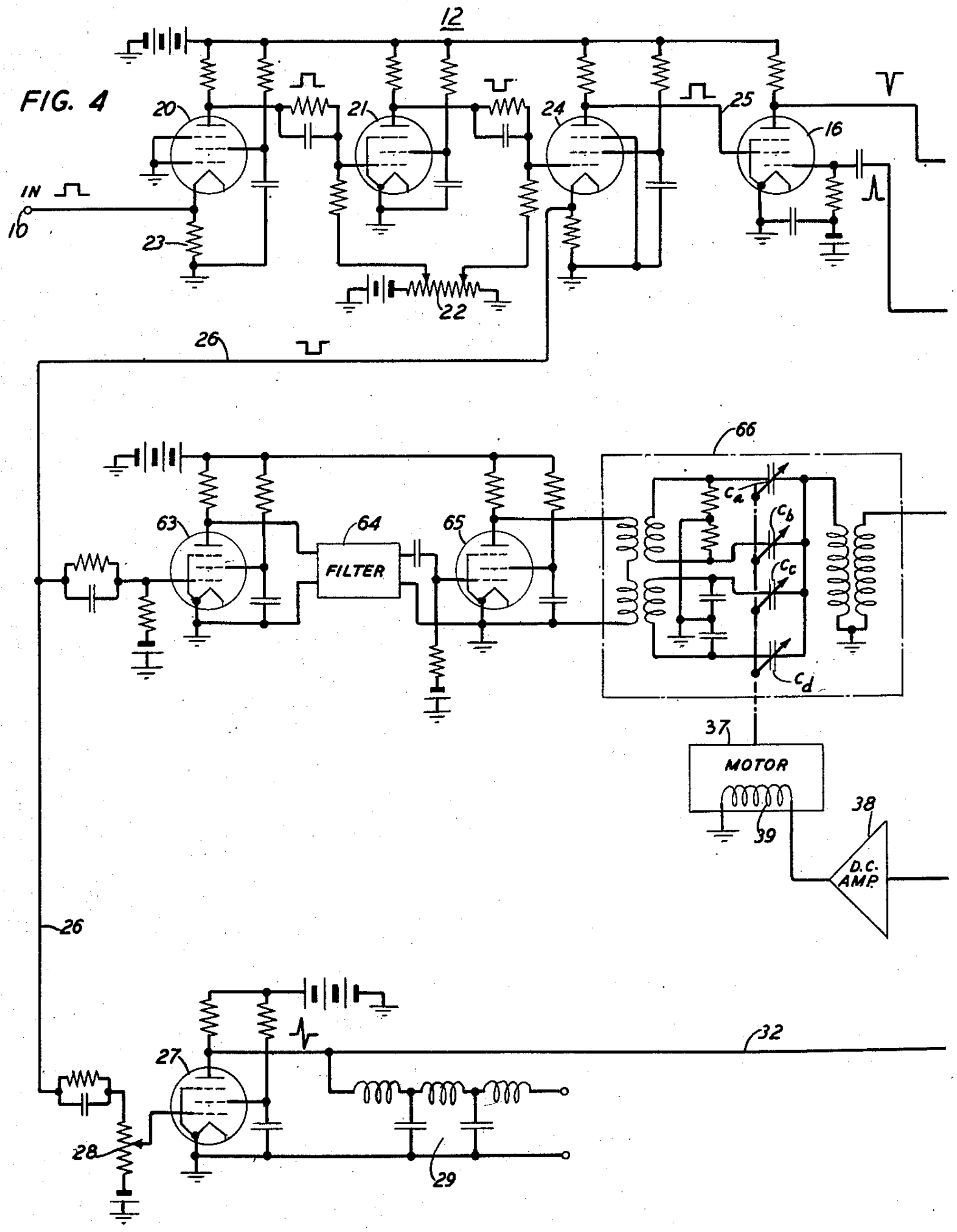
Figure 5:
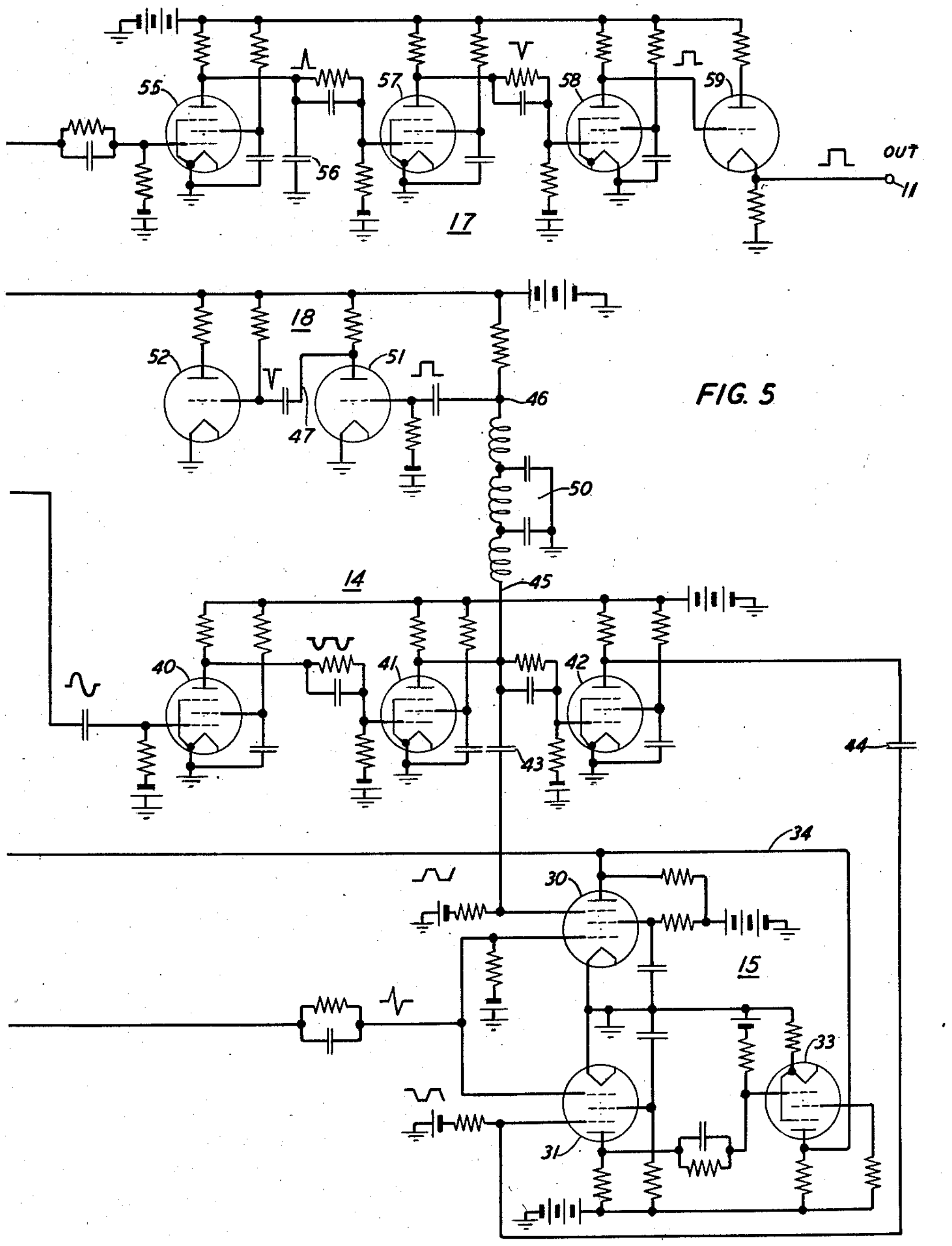

Figs. 4 and 5, when placed together with Fig. 5 to the right of Fig. 4 show the schematic circuit diagram of a complete repeater circuit according to the invention.

Fig. 6 shows typical characteristics of the pulse selecting filter.

In my copending application Serial No. 29,770, filed of even date herewith, there is disclosed and claimed a regenerative repeater using a local oscillator for supplying properly timed and phased pulses for regenerative repeating. An automatic phase control is provided for said oscillator for maintaining the locally produced pulses in proper phase.

The present application discloses a regenerative repeater generally similar to that of my copending application but having a different means for producing the locally supplied pulses. In the present disclosure, the local pulses are derived from the incoming pulses by frequency selection. The derived pulses are maintained in proper phase relation with respect to received pulses by an automatic phase control similar in construction to that disclosed in my copending application, but operating to introduce varying amounts of phase shift in a circuit carrying current passed by the selecting circuit, as will be more fully disclosed presently.

Reference may be made to my copending application for a discussion of the problem with which the invention is concerned and of the desirability of maintaining the locally supplied pulses in proper time and phase relation with respect to the received pulses. The difference in the two disclosures appears in Figs. 1 and 4. Fig. 5 of this application is identical with Fig. 5 of my copending application and the description of this figure is the same in both applications, the description being repeated herein in full for completeness of disclosure.

Referring first to Fig. 1, the incoming pulses to be repeated are received at terminal 10 and the reformed outgoing pulses appear on output terminal 11. A clipper circuit 12 is used to derive from the incoming pulses, which usually have a rounded and more or less irregular shape, pulses of reasonably steep wave front and flat top suitable for application to the gate circuit 16. The locally produced pulses are derived from received pulses by means of a filter 64 the output of which is provided with an automatic phase shifter 66. The output from the phase shifter 66 is sent through a clipper 14 which produces steep-front flat-topped pulses. These, together with the pulses in the output of clipper 12, are fed into the phase control 15 where they are compared against each other as to phase.

If the received pulses vary slightly in frequency from the center of the pass band of filter 64 they are shifted in phase and these variations show up in the output circuit of the phase control 15 as a variable current which is used to adjust the phase shifter 66 in such manner as to cause the pulses in the output of the clipper 14 to be maintained in close phase agreement with the output pulses from clipper 12.

The output pulses from the clipper 14 are passed through a phase delaying and voltage peaking circuit 18 to cause the resulting pulses as applied to the gate 16 to coincide with about the center of the received pulses from clipper 12. The gate circuit 16 produces an output pulse only when there is an input pulse on each of the leads from the clipper 12 and the circuit 18. The output pulses from the gate 16 are given proper shape in the circuit 17, the output of which leads to the output terminal 11.

It is seen from this general description that the phase control 15 insures correct phasing of the local pulses so that the gating pulse from circuit 18 is supplied to the gate 16 in the correct phase relation with respect to the received pulses from the clipper 12, regardless of slight momentary variations in phase or time of receipt of the latter pulses. The amount of delay introduced at 18 is sufficient to cause the locally produced peaked wave applied to the gate 16 to coincide with about the middle of the wave from the clipper 12.

Referring now to the complete circuit shown in Figs. 4 and 5, the clipper 12 consists of the input tube 20 and the two tandem tubes 21 and 24. The tube 20 operates as a grounded grid tube, the signals on terminal 10 being applied to the cathode end of the resistor 23. Tubes 21 and 24 have the proper amount of control grid bias furnished to them from potentiometer 22 to cause these tubes to limit the incoming pulses at both the top and the bottom portions. Tube 24 has one output connection from the plate of the tube over lead 25 to the control grid of the gate 15 and it has another output from the cathode resistor over lead 26 to the grid of tube 63 and to the grid of tube 27. The plate load of the tube 27 consists of an open-circuited delay line 29 with a round trip delay that is short compared to the pulse length. This results in differentiation of the pulse producing a positive "pip" for the leading edge and a negative "pip" for the trailing edge of the pulse. Negative bias is supplied to the control grid of the tube 27 from potentiometer resistor 28. Resistor 49 in the plate feed circuit forms a terminating impedance for delay line 29.

Tube 63 is an amplifier with its output connected to filter 64. The filter 64 has a comparatively narrow transmission band with sharp cut-off at both edges, in order to separate the fundamental frequency of the incoming pulses from noise or other undesired components of neighboring frequencies. The pass band must be wide enough to accommodate such variations as may occur in the fundamental pulse frequency from time to time. Fig. 6 gives a typical or suitable characteristic for this filter. The sharp cut-off is accompanied by steep phase shift within the band. When the frequency of the received pulses varies to either side of the mid-frequency of the pass band it is seen that shifting of phase may occur, which if not compensated, might vary the timing relation between the received pulses and the pulses to be supplied locally for pulse regeneration at the repeater. It is the function of the phase shifter 66 to correct for the phase differences between the received pulses and the pulses to be supplied locally.

The output waves from filter 64 are passed through buffer amplifier 65 and impressed on phase shifter 66. This phase shifter may, for illustration, be of the type disclosed in United States Patent 2,004,613 issued June 11, 1935, to L. A. Meacham. It comprises the parts included within the broken line rectangle 66, and the variable element consists of the rotors of the four condensers $C_a$, $C_b$, $C_c$, and $C_d$, which are ganged and connected to the shaft of a motor 37 for rotary adjustment in one direction or the other in order to shift by different amounts the phase of waves traversing the circuit. The phase is continuously variable throughout any range by movement of the motor shaft.

The output waves from phase shifter 66 are applied to the clipper 14 consisting of input tube 40 followed by two limiting stages 41 and 42. Suitable negative grid bias is applied to the control grids of these tubes to cause them to operate at the proper point of their characteristic to provide limiting. Approximately square-shaped waves appear on the plate of tube 41 and similarly shaped waves shifted 180 degrees in phase appear on the plate of tube 42.

The phase comparison circuit 15 is essentially a balanced or differential modulator circuit comprising push-pull tubes 30 and 31 with tube 31 followed by a phase reversing tube 33. Square waves from the clipper 14 are applied in opposite phase to the suppressor grids of the tubes 30 and 31 through respective coupling capacities 43 and 44. The short sharp pulses from the tube 27 are applied over conductor 32 to the control grids of tubes 30 and 31 in the same phase. In order to permit the output currents from tubes 30 and 31 to be added in the desired phase, the phase inverting tube 33 is used for the output of tube 31, the plate of tube 33 being directly connected to the plate of tube 30 over a circuit 34 and thence to a direct current amplifier 38, the output of which is connected to a field winding 39 of the motor 37.

The direct current amplifier 38 does not give output current of both signs but only increases and decreases of current above and below a normal value. Motor 37 can, however, be reversed, for example by decrease in output of direct current from the amplifier, by use of another field winding (not shown) supplied with a constant current of just the right value to cause the two fields to cancel each other when the field winding 39 is supplied with the normal value of current from amplifier 39. Increases in amplifier output current above normal drive the motor forward and decreases below normal current drive the motor backward.

The operation of the automatic phase control will be described with the aid of the graphs shown in Fig. 2. The suppressor grids of tubes 30 and 31 are biased negatively to cut-off and these tubes conduct only on the positive portions of the sharp voltage waves received from tube 27. (It will be noted that the interstage plate-to-grid couplings shown throughout the circuit drawing are adapted for the transmission of direct current as well as high frequencies by including both capacity and resistance.) The graphs in Fig. 2 are in three columns I, II and III. Column I represents the balanced condition in which no phase correction is to be made. At the top is shown the positive voltage "pip" from lead 32, somewhat magnified for clarity of illustration. Just below this, the two intersecting graphs represent the cross-over point at which the pulses received from the clipper 14 through the capacities 43 and 44 are reversing in sign. The next three graphs lower down in the figure show respectively the shape of the plate current pulse in tubes 30, 31 and 33. The lowermost curve shows the resultant of adding together the plate pulses from tubes 30 and 33 and this is the current which goes into the input of the direct current amplifier 38. Under the conditions represented in column I, the negative and positive portions exactly balance each other giving no resultant direct current. This type of pulse has no effect on the motor 37.

In column II the voltage "pip" from the tube 37 received over lead 32 arrives slightly before the reversal time of the pulses from the limiter 14. Following this column downward in the figure the $I_{30}$ and $I_{31}$ puses show that a much larger reduction occurs in the space current of tube 30 than in that of tube 31. When the output of tube 31 is inverted in sign by tube 33 and added algebraically to the output from the tube 30, it is seen that the resultant is a negative pulse shown at the bottom of column II. This condition, therefore, results in the production of an increment of negative direct current which causes a reduction in output current in amplifier 38. This, when applied to the motor 37, causes an adjustment in the phase shifter 66 in such direction as to tend to minimize the amount of negative direct current produced; that is, to restore the circuit to a balanced condition.

Column III represents the condition in which the positive "pip" from lead 32 arrives after the reversal time of the pulses from the limiter 14 and, as seen from following down the column, this results in the production of a positive pulse of direct current which is in the direction to make an adjustment in phase shifter 66 opposite in sign to that corresponding to the condition in column II and thus to restore the circuit to normal.

These control means including motor 37 have considerable time lag, so that the over-all result of the operation just described is to make corrective changes in the phase of the output of the phase shifter 66 slowly and in such manner as to hold the square waves in the output of the clipper circuit 14 accurately in phase with the average of the square waves applied over circuit 25 from tube 24 to the control grid of the gating circuit 16. This condition is indicated in Fig. 3 by the uppermost and lowermost graphs of this figure, respectively, where the incoming signal pulse applied to the control grid of gate 16 from lead 25 is shown at the bottom of the figure and the square wave from the clipper 14 is shown at $E_{45}$ at the top of this figure (zero noise assumed for simplicity).

These square waves from the clipper 14 are not applied directly to the control grid of the gate 16 but are applied over lead 45 to the input end of a delay network 50 which delays the pulse for a time equivalent to about one-half the pulse length, as shown at the top of Fig. 3 by the graphs $E_{45}$ and $E_{46}$. The graph $E_{46}$ shows the shape of the wave applied to the grid of the tube 51. This tube acts as a buffer amplifier to prevent any reaction on tube 30. The condenser-resistance combinations in the interstage circuit between tubes 51 and 52 differentiate the square wave to produce the timing "pips" ($P_{52}$) that are used to regenerate the timing pulses for the repeater output. It will be noted that tube 52 has its grid normally highly positive so that the impressed positive "pips" from tube 51 have no effect on the plate current of this tube, but the negative "pips" drive this tube to cut-off thus producing very sharp, high-amplitude, voltage pulses for application to the control grid of the gate tube 16.

Tube 16 is biased negatively by the grid bias battery shown connected to its control grid, to such an extent that no output current is obtained unless both a signal pulse is applied to the screen grid from circuit 25 and a positive "pip" is applied simultaneously to the control grid from tube 52. (The signal pulse may be thought of as a pedestal pulse and the short timing pulse a gating pulse.) The result is that for each received signal pulse, and only when a signal pulse is present together with a timing voltage pulse, an output pulse is sent from the gate tube 16 into the pulse-forming amplifier 17. This pulse as it appears at the plate of tube 16 is a short sharp drop in voltage. The interstage circuits and particularly the shunt condenser 56 in the output of tube 55, operate to lengthen this pulse out to the required length, and clipping takes place in tube 58 by virtue of the large negative bias applied to the control grid. This results in application to the control grid of tube 59 of a positive square voltage wave which is amplified in tube 59 and applied to output terminal 11, tube 59 acting as a cathode follower.

The invention is not to be construed as limited to the particular circuit arrangement disclosed, since this is to be taken as illustrative and by way of example rather than as limiting, the scope of the invention being defined by the claims.

What is claimed is:

1. The method of repeating pulses having a fundamental frequency of occurrence, comprising deriving from received pulses by frequency selection an alternating current having the fundamental frequency of said pulses, producing from said alternating current a continuous series of pulses occurring at said fundamental frequency, and causing one of said produced pulses to be transmitted under control of a received pulse whenever a received pulse is incident upon said repeater.

2. In a regenerative pulse repeater, a receiving circuit for incoming pulses to be repeated, a first and a second branch of said circuit, band-pass filter means in said second branch for deriving from received pulses a continuous series of pulses having the fundamental frequency of the received pulses, an automatic phase shifter for said derived pulses for maintaining them in phase agreement with received pulses, means to supply said pulses from the output of said phase shifter to said first branch, and means in said first branch controlled by received pulses for causing the transmission of individual ones of said supplied pulses.

3. In a regenerative pulse receiver for pulses having a fundamental frequency of occurrence, frequency selective means for deriving from received pulses a continuous series of pulses having said fundamental frequency said frequency selective means having a narrow band-pass characteristic and a variable phase shift over the pass band, circuit means to compare said derived pulses against received pulses to detect variations in phase incidental to variations in timing of received pulses, means controlled from said comparing circuit for adjusting the derived pulses into phase agreement with the received pulses, and means to transmit derived, phase-adjusted, pulses in pulse-for-pulse correspondence with received pulses.

4. In a regenerative repeater for pulses having a fundamental frequency of occurrence, a narrow band filter for deriving from received pulses an alternating current wave of said fundamental frequency, said filter having variable phase shift with frequency within its transmission band, means to produce a continuous series of pulses of said fundamental frequency from said alternating current wave, and means to compensate phase variations in said alternating current wave incidental to variations in timing in received pulses, comprising a phase adjusting circuit including a comparison circuit for comparing said produced pulses against received pulses to detect relative phase variations therebetween, said phase adjusting circuit including means responsive to such detected relative phase variations to counteract said variations, a gating circuit for transmitting pulses, and means to impress on said gating circuit received pulses and said produced, phase adjusted pulses, for jointly determining the transmitted pulses.

5. In a regenerative repeater for pulses having a fundamental frequency of occurrence, a narrow band filter for deriving from received pulses an alternating current wave of said fundamental frequency, said filter having variable phase shift with frequency within its transmission band, means to produce a continuous series of pulses of said fundamental frequency from said alternating current wave, and means to compensate phase variations in said alternating current wave incidental to variations in timing in received pulses, comprising a phase adjusting circuit including a comparison circuit for comparing said produced pulses against received pulses to detect relative phase variations therebetween, said phase adjusting circuit including means responsive to such detected relative phase variations to counteract said variations, means for delaying and differentiating said produced, phase adjusted pulses to produce pulses of shorter duration than the normal signal pulses and occurring at substantially the center of the signal pulse intervals, a gating device having one input circuit connected to receive incoming signal pulses, a second input circuit connected to receive said pulses of shorter duration and an output circuit in which said pulses of shorter duration are repeated only in response to signaling pulses and said pulses of shorter duration appearing simultaneously in said input circuits, and a pulse shaping circuit connected to said output for producing from said repeated pulses of shorter duration, pulses of longer duration substantially equal to that of normal signaling pulses.

WILLIAM M. GOODALL.

REFERENCES CITED

The following references are of record in the file of this patent:

UNITED STATES PATENTS

| Number | Name | Date |
| --- | --- | --- |
| 2,110,438 | Cummings | Mar. 8, 1938 |
| 2,333,281 | Wilder | Nov. 2, 1943 |
| 2,341,902 | Cannon | Feb. 15, 1944 |
| 2,359,649 | Kahn | Oct. 3, 1944 |